Feb. 22, 1944. C. L. COOK 2,342,122
POTATO PLANTER
Filed March 31, 1941
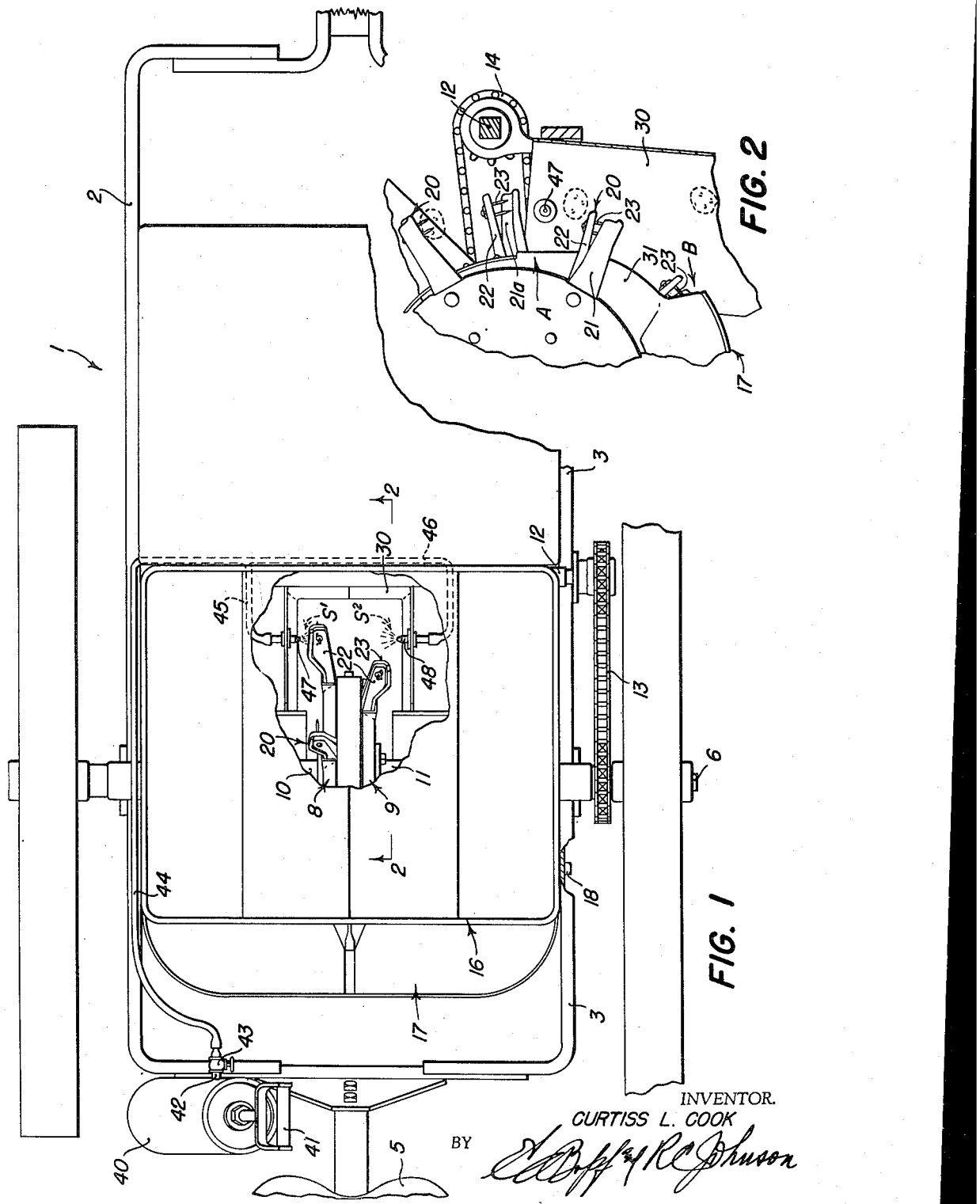
INVENTOR.
CURTISS L. COOK Patented Feb. 22, 1944

2,342,122

UNITED STATES PATENT OFFICE 2,342,122

POTATO PLANTER

Curtiss L. Cook, Syracuse, N. Y., assignor, by direct and mesne assignments, of one-half to Syracuse Chilled Plow Company, Inc., Syracuse, N. Y., a corporation of New York, and one-half to Frank R. Shaw, Presque Isle, Maine Application March 31, 1941, Serial No. 386,044

21 Claims. (Cl. 111—1)

The present invention relates generally to agricultural implements and more particularly to planters and similar machines.

The object and general nature of this invention is the provision of a planter having means carried on the planter for spraying the seed and/or the seed selecting or delivering means with some form of treating material, such as disinfectant or the like so as to cover the seed and/or the seed selecting or delivering means with such material in order to combat infectious diseases or for other purposes. More particularly it is a feature of this invention to provide such means especially adapted for potato planters.

Potatoes are subject to a number of diseases, the treatment of which usually consists in spraying the seed potatoes with suitable disinfecting material, sometime before planting. Some diseases are, however, of highly infectious nature so that there is some likelihood that by virtue of contact with used sacks, bins, etc., the seed may be re-infected. Accordingly, it is a feature of this invention to provide means carried directly on the planter for spraying the seed just a moment or two before it is deposited in the furrow, thus obviating practically all possibility of re-infection. Also, it is another feature of this invention to spray disinfecting material directly onto the seed engaging parts of the seed selecting mechanism.

More specifically, it is a feature of this invention to provide a pair of opposed nozzles which by suitable conduits communicate with a suitable disinfectant container, and to arrange the nozzles so as to direct two sprays laterally inwardly, thereby insuring that both the seed pieces and the points will be adequately covered by the disinfectant. Still further, it is a feature of this invention to arrange the nozzles slightly below the point where the seed pieces are released and permitted to fall to the ground, thus insuring that each and every seed piece will be adequately treated. Another object of the present invention is the provision of an arrangement of this kind which is simple and sturdy, yet highly efficient in action.

While I have shown in the accompanying drawing only a one-row planter, it is to be understood that my invention is equally applicable to two-row machines.

In the drawing:

Figure 1 is a fragmentary plan view of a potato planter in which the principles of the present invention have been incorporated; and Figure 2 is a fragmentary side view illustrating the position of the spraying nozzles relative to the picker arm units.

Referring now to the drawing, the frame of the potato planter is indicated by the reference numeral 1 and includes side bars 2 and 3. An operator's station is indicated at 5. The side bars 2 and 3 have secured thereto suitable bearings through which an axle 6 extends. A pair of rotatable heads 8 and 9 are fixed to sleeves 10 and 11, and the latter are mounted for rotation on the axle shaft 6, being connected to rotate together and driven from axle 6 by any suitable means such as a jackshaft 12 and sprocket chains 13 and 14.

The seed potatoes are normally carried in a hopper 16, the lower portion of which is separated into two spaced apart sections which discharge into a hopper bottom or bowl, indicated in its entirety by the reference numeral 17. The latter consists of a plurality of parts suitably connected together and bolted, as at 18, to the sides 2 and 3 of the planter frame. The bowl is formed with a pair of laterally spaced apart V-shaped grooves that are adapted, respectively, to receive the arm units of two axially spaced sets of arms carried by the rotatable heads 8 and 9. Each of the arm units is indicated by the reference numeral 20, and each includes a stationary arm 21 and a pivoted arm 22 carrying a U-shaped pick 23 having a pair of seed engaging points. The particular construction of the hopper bowl and the arm units is substantially the same as that shown in my co-pending application, Serial No. 378,123, filed February 10, 1941, to which reference may be had if necessary. Hence, no further description is required. The picks 23 of the two sets of arms, which extend generally radially outwardly, move in axially spaced apart vertical planes, and as best shown in Figure 2, the forward portion of the bowl 17 is formed to accommodate a seed chute 30 suitably fixed to or carried by the frame 1 and disposed generally in a vertical position with an open upper end. The chute 30 surrounds the picker arms. The central portion of the bowl 17 consists of a member having an extension 31 which serves to control the operation of the pivoted arms in such a manner that during the rotation of the seed selecting mechanisms, when the arms reach the position shown at A in Figure 2, the potato seed piece impaled on the pick 23 is stripped therefrom and dropped down into the chute 30. The arm unit then moves downwardly and rearwardly, again entering the bowl at the point B in condition to impale another seed piece. Thus, each arm unit operates in this way to engage and select a seed piece and after something like a 270 degree revolution release the same and drop the seed piece down into the chute 30.

The present invention is particularly concerned with the application of treating material, such as a disinfectant, to the seed pieces and the picker points during the operation of the planter. To this end, a tank 40 is secured in any suitable manner to the frame 1 of the planter and is of a well-known type which includes a hand pump 41 operable to maintain the desired air pressure in the tank 40. The tank 40 normally contains disinfectant or other material in the form of a liquid. The outlet of the tank 40 is indicated by the reference numeral 42 and includes a manual valve 43 which serves to cut off the discharge of material from the tank at any time that the operator turns the valve 43 to its closed position. A conduit 44 leads away from the outlet 42 and extends forwardly. A pair of branches 45 and 46 lead from the conduit 44 to a pair of nozzles 47 and 48. These nozzles are disposed in opposed transverse relation on opposite sides of the two sets of rotatable arm units, the nozzles being spaced apart to permit the arm units to move therebetween. Preferably, the nozzles are mounted on the sides of the seed chute 30 substantially in the horizontal plane that extends through the axle 6, and just below the point at which the seed piece is stripped from the associated picker arm.

Each of the nozzles 47 and 48 is of conventional construction and, if desired, may be made adjustable so as to deliver exactly the desired quantity of treating material. Preferably, the nozzles are of the oil burner type, delivering a conical spray, as indicated in Figure 1 by the reference characters $S^1$ and $S^2$. As mentioned above, each of the arm units includes relatively movable members one of which carries a peg for engagement with a seed piece. Preferably, the stationary arm 21 of each unit includes a laterally outer flange 21a within which the other or pivoted arm 22 is disposed after a seed piece has been impaled.

The operation of a potato planter constructed according to the principles of this invention is substantially as follows:

When the operator is ready to plant, he manually opens the valve 43, first having operated the pump 41 to develop sufficient pressure in the tank 40. As the machine passes along the row the picker arm heads pass through the mass of seed in the hopper bowl, each arm impaling a seed piece and then carrying it over and at the point A (Figure 2) releasing the seed piece and dropping it down through the chute 30. As soon as the operator opens the valve 43, disinfectant or other treating material is discharged laterally inwardly from both sides through the nozzles 47 and 48. The nozzles are disposed below the seed piece at the point of its discharge and therefore as the seed piece, still impaled, approaches the spraying zone, the lower portion of the seed piece receives some of the material. Then when the seed piece is released it falls through the spray, being entirely covered during its passage. After the seed piece is released the arm units also pass through the spray of disinfectant or other treating material, each receiving the spray from both sides. The spray reaches the points of the seed engaging picks by the spray from one passage to the two adjacent picker arms at the other side so that, notwithstanding the presence of the flange 21a, the picker points, as well as other parts of the arm units, are thoroughly covered by the sprayed material.

Since each seed piece receives its charge of disinfecting material just prior to the placing of the seed piece in the ground, it will be seen that there is no possibility of the seed piece becoming re-infected by contact with other sources of infection, as sometimes occurs when the seed are dipped prior to planting and then stored in bins or sacks until they are taken to the planter. It is also an important part of this invention to spray disinfectant on the arm units so that there is no possibility that they can ever serve as means spreading infectious diseases from one seed piece to the other.

It will be understood that the spray nozzles may be located at any point in the travel of the picker arm units, according to the operation desired, and that if necessary more than one pair of nozzles may be employed. On the other hand, under certain conditions only one nozzle may be necessary. When the operator reaches the end of the row and raises the furrow openers into transport position, he also shuts off the valve 43, thus terminating temporarily the flow of fluid to the nozzles. After he turns around and starts down the adjacent row, he opens the valve 43 again. During the travel of the machine the operator will occasionally operate the pump 41 a few strokes in order to maintain the desired pressure in the tank 40. A hand pump of this kind forms a simple and economical way of delivering disinfectant and other treating material to the nozzles, but if desired, suitable mechanism may be arranged for automatically maintaining the desired pressure within the tank 40, such as by driving a pump or the like from the rotation of the axle 6. Also, if desired, the valve 43 may be arranged to be automatically shut off whenever the furrow openers are raised into transport position, which also interrupts the drive to the picker arm units.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A planter comprising movable seed holding and delivering means, and means for discharging seed treating material onto the seed on said seed holding means when the seed and seed holding means pass adjacent said material discharging means.

2. A planter comprising a container for seed, seed selecting means movable through said container and into a seed discharging position, and means for spraying disinfectant, said means being located on the planter so as to spray the disinfectant onto said seed before it is discharged and onto said seed selecting means after the seed has been discharged therefrom.

3. A planter having a hopper adapted to contain seed pieces, seed selecting means movable through said hopper to select seed therefrom for planting, and means carried by the hopper for disinfecting the seed pieces and said seed selecting means.

4. A planter comprising a hopper adapted to contain seed pieces, rotatable seed selecting means including a plurality of arm units movable through said hopper to select seed therefrom and adapted to discharge the seed at a given point after its removal from the hopper, a container on the planter for disinfectant, and means for discharging disinfectant from said container transversely onto the seed on said arm units and portions of the latter.

5. A planter comprising a hopper adapted to contain seed pieces, rotatable seed selecting means including a plurality of arm units movable through said hopper to select seed therefrom and adapted to discharge the seed at a given point after its removal from the hopper, a container on the planter for disinfectant, a laterally directed nozzle disposed between the point where the seed is discharged from the arm units and the point where the latter reenter the hopper, and means for supplying disinfectant under pressure from said container to said nozzle.

6. In a planter having an operator's station and seed conveying means, a container for disinfectant and the like, means controllable from the operator's station for governing the flow of disinfectant therefrom, conduit means leading therefrom toward the seed conveying means, and means connected therewith for spraying disinfectant onto said seed conveying means.

7. The combination set forth in claim 6, further characterized by means for maintaining the disinfectant in said container under pressure, and valve means controlling the flow of disinfectant through said conduit.

8. A planter comprising a unit including a rotatable member having seed engaging points, and means including a pair of transversely arranged opposed nozzles disposed on opposite sides of the plane of rotation of said points for spraying disinfectant and the like onto said points.

9. A planter comprising a seed containing hopper, a pair of axially spaced rotatable heads, each having a set of radially outwardly extending picker arms having seed engaging points, a container for disinfectant or the like, a pair of opposed nozzles disposed transversely so as to spray said points with disinfectant or the like, and conduit means leading from said source of disinfectant to said nozzles.

10. A planter comprising a pair of rotatable seed selecting units, each unit including a set of radially extending arms having relatively movable portions and each arm having one portion provided with a laterally outwardly disposed shielding flange, picker points carried by said arm units, and means for spraying said points with disinfectant or the like including a container on the planter, a pair of opposed nozzles adapted to direct a spray of material laterally inwardly, and conduit means leading from said container to said nozzles, the latter being spaced apart to provide for the movement of said arm units therebetween, each nozzle being situated so as to direct a spray of material through the space between adjacent arm units onto the picker points of the arms of the other units.

11. A planter comprising seed selecting means, means for discharging seed from said seed selecting means, and means for applying seed treating material to said seed after they have been discharged from said seed selecting means and as they pass along their path of movement to the ground.

12. A planter comprising seed selecting means, means for discharging seed from said seed selecting means, and means for applying seed treating material to said seed from opposite directions after they have been discharged from said seed selecting means and as they pass along their path of movement to the ground.

13. A planter comprising seed selecting means movable from a seed discharging position to a second position in which the succeeding seed is engaged, and means for spraying disinfectant or the like onto said seed selecting means generally from opposite sides thereof during its movement from one of said positions to the other.

14. A planter comprising a unit including a rotatable member having seed engaging points, and means including a pair of spaced apart nozzles for spraying disinfectant and the like onto said points from different directions so as to substantially cover said points with disinfectant or the like.

15. A planter comprising a hopper adapted to contain seed pieces, seed selecting means movable through said hopper to select seed therefrom and adapted to discharge the seed after its removal from the hopper, and means for applying seed treating material to said seed selecting means and including a pair of spaced apart units directed toward the path of movement of said seed selecting means from different directions so as to substantially cover said seed selecting means with seed treating material.

16. A planter comprising seed selecting means movable from a seed discharging position to a second position in which the succeeding seed is engaged, and means establishing a zone containing seed treating material through which said seed selecting means and the seed selected thereby pass during movement of the seed selecting means toward seed discharging position.

17. Means for disinfecting the seed picking elements of potato seed planting apparatus of the type in which one or more seed picking elements move through a cycle of operations comprising seed-engaging and seed-releasing operations, said means comprising a device supported on said apparatus adjacent the path of said elements and adapted to discharge a cleansing spray thereover as each element passes from seed-releasing to seed-engaging position, and means for supplying spray material to said device.

18. In combination, potato seed planting apparatus comprising a plurality of seed picking elements movable in a closed path for successively engaging and releasing seeds, a spray nozzle supported on said apparatus adjacent said path and adapted to discharge a cleansing spray over each said element as it passes from seed-releasing to seed-engaging position, and means for supplying spray material under pressure to said nozzles.

19. Method for disinfecting the seed picking elements of potato seed planting apparatus of the type in which individual seeds are successively dispensed, comprising the step of subjecting the seed picking elements individually to a cleansing spray, each said element being sprayed after it has released a seed and before it has engaged another seed.

20. Means for disinfecting the seed picking elements of potato seed planting apparatus of the type in which one or more seed picking elements move through a cycle of operations comprising seed-engaging and seed-releasing operations, said means comprising a nozzle supported on said apparatus adjacent the path of said elements and adapted to discharge a cleansing spray thereover as each element passes from seed-releasing to seed-engaging position, and means for supplying spray material under pressure to said nozzle.

21. In combination, potato seed planting apparatus comprising a plurality of seed picking elements movable in a closed path for successively engaging and releasing seeds, and means supported on said apparatus adjacent said path and adapted to discharge a cleansing spray over each said element as it passes from seed-releasing to seed-engaging position.

CURTISS L. COOK.